(12) United States Patent
Hor-Lao et al.

(10) Patent No.: US 10,382,105 B2
(45) Date of Patent: Aug. 13, 2019

(54) BEACON FRAME TRANSMISSION USING LEARNED BEAMFORMING PARAMETERS

(71) Applicant: Motorola Mobility LLC, Chicago, IL (US)

(72) Inventors: Mary Khun Hor-Lao, Chicago, IL (US); Ranjeet Gupta, Naperville, IL (US)

(73) Assignee: Motorola Mobility LLC, Chicago, IL (US)

( * ) Notice: Subject to any disclaimer, the term of this patent is extended or adjusted under 35 U.S.C. 154(b) by 0 days.

(21) Appl. No.: 15/826,311

(22) Filed: Nov. 29, 2017

(65) Prior Publication Data
US 2019/0165838 A1 May 30, 2019

(51) Int. Cl.
*H04B 7/0417* (2017.01)
*H04B 7/0452* (2017.01)
*H04W 84/12* (2009.01)

(52) U.S. Cl.
CPC ......... *H04B 7/0421* (2013.01); *H04B 7/0452* (2013.01); *H04W 84/12* (2013.01)

(58) Field of Classification Search
CPC combination set(s) only.
See application file for complete search history.

(56) References Cited

U.S. PATENT DOCUMENTS

| | | | |
|---|---|---|---|
| 8,965,411 B1 * | 2/2015 | Busch-Sorensen | ... H04W 24/00 |
| 10,051,506 B1 | 8/2018 | Mistry et al. | |
| 10,285,216 B2 | 5/2019 | Hor-Lao et al. | |
| 2008/0247370 A1 * | 10/2008 | Gu | ............. H04Q 7/24 |
| 2010/0009674 A1 | 1/2010 | Sapkota et al. | |
| 2010/0234026 A1 | 9/2010 | Tenny et al. | |
| 2012/0163307 A1 | 6/2012 | Wang et al. | |
| 2013/0212663 A1 | 8/2013 | Edge et al. | |
| 2014/0225775 A1 | 8/2014 | Clevorn et al. | |

(Continued)

OTHER PUBLICATIONS

Khalil,"Differentiated Multiuser Resource Allocation Scheme for Multiband UWB Systems", Jul. 22, 2009, 6 pages.

(Continued)

*Primary Examiner* — Ronald B Abelson
(74) *Attorney, Agent, or Firm* — SBMC

(57) ABSTRACT

Various embodiments transmit targeted beacon frames using beamforming techniques. Using a first beam-formed wireless connection to a user device, a wireless networking device dynamically learns directional and/or spatial location information associated with the user device, such as transmission and/or reception angles. In turn, the wireless networking device stores the directional information in a location database to track successful connections to user devices. Some embodiments target the transmission of beacon frames to a predefined coverage area by using the stored directional information to determine transmission parameters for a second beam-formed wireless signal. Alternately or additionally, some embodiments use pre-programmed values to determine the transmission parameters of the second beam-formed wireless signal. Responsive to determining the transmission parameters, the wireless networking device transmits beacon frames via the second beam-formed wireless signal to transmit the beacon frames to the predefined coverage area.

20 Claims, 11 Drawing Sheets

(56) References Cited

U.S. PATENT DOCUMENTS

| | | |
|---|---|---|
| 2016/0021664 A1 | 1/2016 | Chou |
| 2016/0338121 A1 | 11/2016 | Wietfeldt et al. |
| 2017/0041812 A1 | 2/2017 | Iuzzolino et al. |
| 2017/0070923 A1 | 3/2017 | Li et al. |
| 2017/0188298 A1 | 6/2017 | Pattan et al. |
| 2019/0029055 A1 | 1/2019 | Hor-Lao et al. |
| 2019/0029056 A1 | 1/2019 | Hor-Lao et al. |

OTHER PUBLICATIONS

Lakshmanan,"Practical Beamforming based on RSSI Measurements using Off-the-shelf Wireless Clients", Nov. 6, 2009, 7 pages.
Lee,"Group-Oriented Multiuser Beamforming-OFDM for Different QoS Requirement", Jun. 2011, 3 pages.
Pefkianakis,"CMES: Collaborative Energy Save for MIMO 802.11 Wireless Networks", Oct. 2013, 10 pages.
Riggio,"Interference Management in Software-Defined Mobile Networks", May 2015, 7 pages.
Sun,"Bringing Mobility-Awareness to WLANs using PHY Layer Information", Dec. 2, 2014, pp. 53-65.
Yu,"Power Management of MIMO Network Inter-faces on Mobile Systems", Jun. 23, 2011, 14 pages.
"Non-Final Office Action", U.S. Appl. No. 15/656,722, dated Nov. 29, 2018, 9 pages.
"Corrected Notice of Allowance", U.S. Appl. No. 15/656,722, dated Apr. 8, 2019, 2 pages.
"Non-Final Office Action", U.S. Appl. No. 15/656,881, dated Mar. 21, 2019, 11 pages.
"Notice of Allowance", U.S. Appl. No. 15/656,722, dated Mar. 21, 2019, 5 pages.

* cited by examiner ns, such as access points, provide user devices with access to a wired network. To connect with user devices, the wireless networking device advertises its presence by wirelessly transmitting information. In turn, as a user device moves within working range of the wireless networking device, it detects the advertisement, and subsequently attempts to connect to the wireless networking device. However, even if the user device successfully connects to the wireless networking device, the wireless networking device continues to transmit advertisements in order to inform other user devices of its presence. These additional advertisements can cause radio frequency (RF) noise to currently connected user devices and/or user devices in other wireless networks, such as adjacent regions supported by other wireless networking devices.

BEACON FRAME TRANSMISSION USING LEARNED BEAMFORMING PARAMETERS

BACKGROUND

Wireless networking devices, such as access points, provide user devices with access to a wired network. To connect with user devices, the wireless networking device advertises its presence by wirelessly transmitting information. In turn, as a user device moves within working range of the wireless networking device, it detects the advertisement, and subsequently attempts to connect to the wireless networking device. However, even if the user device successfully connects to the wireless networking device, the wireless networking device continues to transmit advertisements in order to inform other user devices of its presence. These additional advertisements can cause radio frequency (RF) noise to currently connected user devices and/or user devices in other wireless networks, such as adjacent regions supported by other wireless networking devices.

BRIEF DESCRIPTION OF THE DRAWINGS

Embodiments for transmitting beacons in a predefined coverage area using beam-formed wireless signals is described with reference to the following Figures. The same numbers may be used throughout to reference like features and components that are shown in the Figures.

DETAILED DESCRIPTION

Overview

Various embodiments transmit targeted beacon frames using beamforming techniques. Using a first beam-formed wireless connection to a user device, a wireless networking device dynamically learns directional and/or spatial location information associated with the user device, such as transmission and/or reception angles. In turn, the wireless networking device stores the directional information in a location database to track successful connections to user devices. Some embodiments target the transmission of beacon frames to a predefined coverage area by using the stored directional information to determine transmission parameters for a second beam-formed wireless signal. Alternately or additionally, some embodiments use pre-programmed values to determine the transmission parameters of the second beam-formed wireless signal. Responsive to determining the transmission parameters, the wireless networking device transmits beacon frames via the second beam-formed wireless signal to the predefined coverage area.

The various embodiments described herein provide transmitting beacon frames via a beam-formed wireless signal using learned directional information. By using beam-formed wireless signals to transmit beacon frames, a wireless networking device can target locations with historically successful connections to user devices and reduce the RF noise that transmission contributes to other devices relative to RF noise generated by omnidirectional beacon frame transmissions. Since beam-formed wireless signals concentrate the corresponding RF signal to a particular region, user device, and/or predefined coverage area, this allows various wireless networking devices operating in adjacent or overlapping regions to successfully connect with corresponding user devices without experiencing RF noise generated by, or contributing RF noise to, other wireless networking devices. Further, the spatial location information used in generating beam-formed wireless signals can also be used to improve indoor positioning information of an associated user device relative to other positioning techniques, such as Global Positioning System (GPS) based location information.

While features and concepts for transmitting beacon frames using beam-formed wireless signals can be implemented in any number of different devices, systems, environments, and/or configurations, example embodiments of directional and/or predefined coverage of beacon frame transmission are described in the context of the following example devices, systems, and methods.

Example Operating Environment

Figure 1:
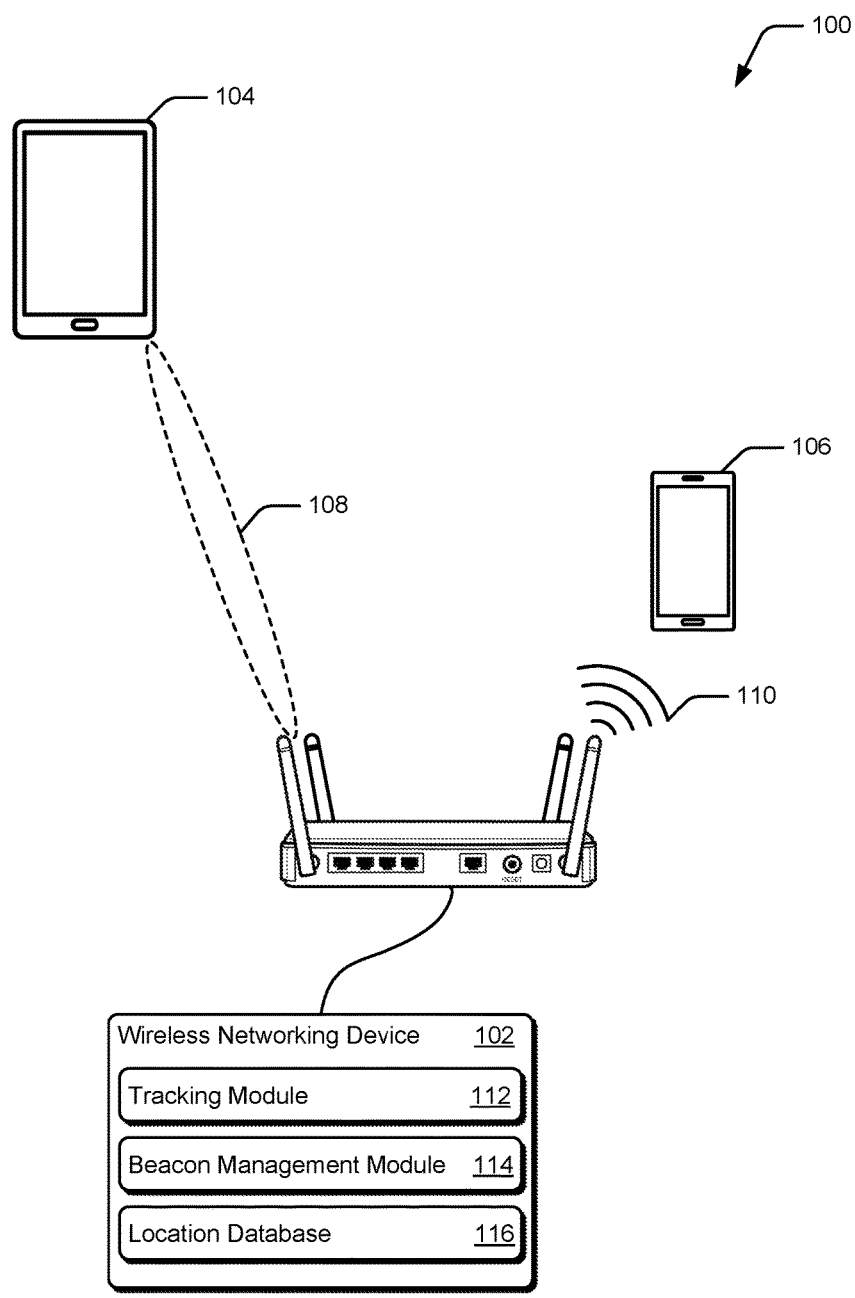
FIG. 1 illustrates an example operating environment in accordance with one or more embodiments.

FIG. 1 illustrates example environment 100 according to one or more embodiments. Environment 100 includes wireless networking device 102, illustrated here as an access point, user device 104, illustrated as a tablet, and user device 106, illustrated as a smart phone. Among other things, wireless networking device 102 provides various user devices, such as user device 104 and user device 106, with connectivity into a wired network. In order to enable these connections, the wireless networking device wirelessly advertises its presence by transmitting beacon frames. In turn, when user devices move or power up within working range of wireless networking 102, they use the beacon frames as a way to locate wireless networking device 102 and/or identify information used to establish a connection with wireless networking device 102.

In some embodiments, wireless networking device 102 can simultaneously transmit beacon frames and/or support multiple different wireless connection types through the use of multiple antenna. For instance, a first antenna of the wireless networking device can be directed towards wireless communications using an omnidirectional radiation pattern, and other antennas can be directed towards wireless communication using beamforming techniques. This allows the wireless networking device to support older (legacy) devices using the omnidirectional antenna, and newer devices using the beamforming techniques. Thus, by supporting multiple different wireless connection types, the same wireless networking device can support older devices, while providing new technology to newer devices via beamforming techniques Here, wireless networking device 102 transmits targeted beacon frames to user device 104 via a beam-formed wireless signal 108, and generally transmits beacon frames to user device 106 via omnidirectional wireless signal 110. Alternately or additionally, beam-formed wireless signal 108 and/or omnidirectional wireless signal 110 can represent data connections between the user devices and wireless networking device 102. In some embodiments, wireless networking device 102 identifies a direction in which to transmit beam-formed wireless signal 108 based upon historical location data it has collected from past successful connections to various user devices as further described herein. However, the direction can be determined in any other suitable manner, such as through predefined location data and/or dynamically learned location data.

Wireless networking device 102 includes tracking module 112, beacon management module 114, and location database 116. Tracking module 112 collects spatial location data associated with a currently connected user device. For instance, after user device 104 has successfully connected to wireless networking device 102, tracking module 112 can use information about the connection to determine the spatial location of user device, and store it in location database 116. For example, the Institute of Electrical and Electronics Engineers (IEEE) 802.11 standards (corresponding to media access control (MAC) and/or physical layer (PHY) communications) includes various techniques and/or protocols that can be used to measure a particular user device's distance. Alternately or additionally, tracking module 112 can obtain location information from a user device during the association process, where each device provides location information (e.g., x, y, z and theta, "Location Civic Address", "LCI" and "Z", Wi-Fi location information, etc.). In some implementations, tracking module 112 derives theta angle information during beamforming, where theta angle information can be used to focus beacon frame transmissions in a particular direction as further described herein. Thus, tracking module 112 can obtain location information in a combination of ways. While described here in the context of a single beam-formed connection to a single user device (e.g., beam-formed wireless signal 108 and user device 104), tracking module 112 can alternately or additionally acquire spatial location data corresponding to multiple user devices based on multiple beam-formed connections.

Beacon management module 114 determines how to transmit beacon frames. For instance, some embodiments of wireless networking device 102 can transmit multiple types of wireless signals, such as an omnidirectional wireless signal using a first antenna of the wireless networking device, and beam-formed wireless signals with additional pairs of antennas. If no location and/or directional data exists (e.g., predefined location information, historical location information, default location information, etc.), beacon management module 114 can determine to transmit beacon frames over an omnidirectional wireless signal, since this radiation pattern increases the probability of reaching a user device. Alternately or additionally, if location and/or direction information exists, beacon management module 114 can determine to transmit beacon frames using a beam-formed wireless signal, as well as in which direction to transmit the beam-formed wireless signal. For instance, beacon management module 114 can extract information from location database 116, and analyze the information to identify locations and/or directions that have a higher probability of successful data transmissions via beamforming and/or connections to user devices relative to other locations. Alternately or additionally, beacon management module 114 can extract specific locations and/or directions, such as user-defined locations. Some embodiments of beacon management module 114 interface with hardware (such as through a hardware driver) and/or generate information used by hardware to configure and/or reconfigure the antennas used to transmit the directional beam-formed wireless signals and/or omnidirectional wireless signals.

Location database 116 stores location information corresponding to the spatial locations of various user devices. In some embodiments, location database 116 stores location information and/or transmission parameters learned by wireless networking device 102 from successful connections and/or data transmissions to user devices (current or past), such as spatial location information generated by tracking module 112. Alternately or additionally, location database 116 can store predefined and/or user-defined transmission direction and/or location information. For example, location database 116 can store information entered by a user that configures what direction and/or location wireless networking device 102 transmits beacon frames in, and/or what shape or range the transmission covers. Any suitable type of spatial location information can be stored, such as reception and/or transmission angle information used to tune antennas that generate directional beam-formed wireless signals, region size and/or shape information, and so forth. In some embodiments, location database 116 includes relational information that associates a particular set of location information to a specific user device.

Having described an example operating environment in which various embodiments can be utilized, consider now a discussion of signal radiation patterns in accordance with one or more embodiments.

Signal Radiation Patterns

Computing devices today often times include wireless capabilities to connect with other devices. To communicate information back and forth, the computing devices establish a wireless link between one another that conforms to predefined protocol and frequency standards. This conformity provides a mechanism for the devices to synchronize and exchange data via the wireless signals. A wireless link can be more powerful than a wired link in that it provides more freedom to the connecting devices. A device can connect wirelessly to any recipient device that supports a same wireless link format without using any additional peripheral components or devices. Not only does this allow the devices to exchange data, but it provides the additional benefit of mobility by eliminating a wired connection that physically tethers the communicating device.

Antennas are used to propagate and receive wireless signals. Being a form of electromagnetic radiation, the wireless signals propagated between the respective devices adhere to various wave and particle properties, such as reflection, refraction, scattering, absorption, polarization, etc. One type of antenna design is a dipole antenna. A dipole antenna includes two components that are usually symmetrical in length. In a half-wave dipole antenna, each pole has length of $\lambda/4$, where $\lambda$ represents a wavelength corresponding to a frequency at which the dipole antenna is resonant. When an antenna is resonant, waves of current and voltage traveling between the arms of the antenna create a standing wave. Further, the antenna has its lowest impedance at its resonant frequency, thus simplifying impedance matching between the antenna and transmission lines for transmission or reception. In turn, this affects the power consumption and efficiency of an antenna. By careful adjustments to the antenna impedance, length, radius, and so forth, a designer can choose the frequency at which the corresponding antenna resonates. When transmitting, dipole antennas radiate with an omnidirectional pattern. However, other antenna configurations can be used to transmit omnidirectional patterns as well. One advantage to an omnidirectional radiation pattern is that it yields comprehensive coverage over a large area.

Figure 2A:
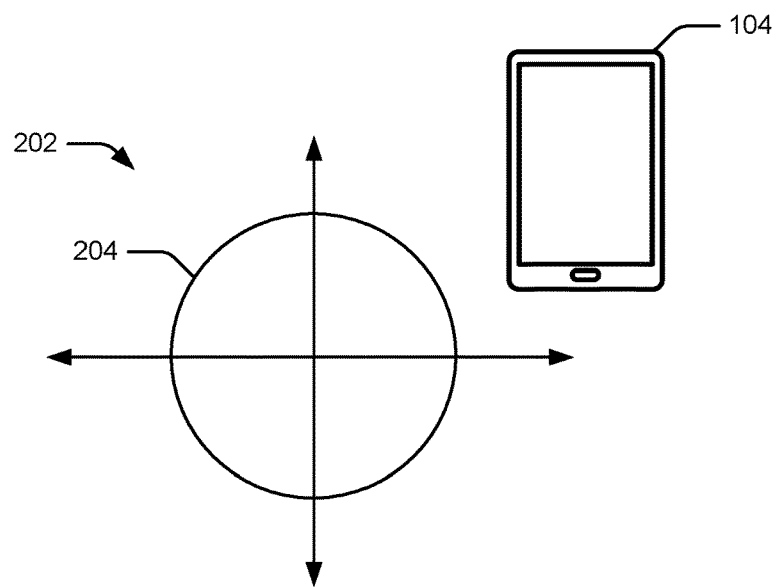
FIGS. 2a and 2b illustrate two-dimensional transmission patterns in accordance with one or more embodiments.

Consider FIG. 2a that illustrates a two-dimensional graph 202 that plots an example omnidirectional radiation pattern 204. In some implementations, FIG. 2a illustrates an example of a legacy transmission pattern used for beacon transmissions. Here, the omnidirectional radiation pattern forms a circle of coverage, where the corresponding antenna radiates an equal amount of energy in all directions. However, real-world implementations can deviate from this due to physical variations in the implementations. Among other things, radiation pattern 204 radiates outwardly from its source (e.g., the center of graph 202), where its signal strength tapers off as the signal moves away from its source. FIG. 2a also includes user device 104 of FIG. 1 as the intended target or recipient of radiation pattern 204. In this example, user device 104 has been positioned in the upper right quadrant of graph 202. However, due to radiation pattern 204 having equal amounts of energy in all directions, user device 104 can move to other quadrants and generally receive the same signal and/or energy level. This also holds true for other devices that are co-resident within graph 202. For instance, consider a case in which a laptop resides in the lower left quadrant of graph 202. Since radiation pattern 204 is omnidirectional, the corresponding wireless signal can service the laptop as well, although time-slicing of data transmission and/or logical channels may be used to alternate what and when information is sent (e.g., user device 104 is serviced in time slot 1, the laptop in time slot 2, etc.).

In terms of connecting with other devices, an omnidirectional radiation pattern allows the transmitting device to transmit without having any information on the location of a connecting device, since energy is transmitted equally in all directions. Thus, with respect to wireless networking device 102 of FIG. 1, radiation pattern 204 allows the wireless networking device to transmit in all directions and service various user devices without needing any a priori knowledge of where the user devices are physically located. As an added benefit, the construction of omnidirectional antennas (such as a dipole antenna) is inexpensive to build relative to other antennas. In turn, these cost savings can be passed along to a consumer who wishes to purchase the transmitting device. An omnidirectional radiation pattern also allows flexibility in the transmitting device's location, since the signal is transmitted in all directions. This can be advantageous to a wireless networking device, since user devices can be portable and move from location to location. However, a downside to this approach is that since the antenna transmits energy in all directions, it also receives energy in all directions, thus reducing the signal-to-noise ratio (SNR), which, in turn, can make the communications more prone to errors. Another disadvantage to an omnidirectional radiation pattern is that since it transmits energy in all directions, it is more likely to overlap with other transmitted signals. In other words, if other devices located in the same or adjacent region transmit additional RF signals, the omnidirectional wireless signal can contribute unwanted noise to these other devices that are unintended recipients.

As an alternative to an omnidirectional transmission pattern, other antennas transmit a directional signal using beamforming techniques.

Beamforming combines transmissions from multiple antenna to create emission patterns using constructive or destructive interference. As one example, beamforming devices can use phased array antennas that work together to exploit these properties. By influencing the frequency, phase, and/or amplitude of each RF signal transmitted from a respective antenna, a transmitting device can generate a signal with a selective spatial pattern and/or direction. For example, two signals that are identical in frequency and amplitude are said to be in-phase if their oscillations are separated by 0° or 360°. Signals that are in phase exhibit constructive interference when they collide, which results in a single wave with an amplitude greater than either of the individual waves. Conversely, two signals that are identical in frequency and amplitude are said to be out-of-phase if their oscillations are separated by 180°. Signals that are out of phase exhibit destructive interference when they collide, thus cancelling each other out and resulting in no signal. Signals that vary from being perfectly in-phase or out-of-phase from one another result in partial construction or destruction, depending upon the phase differences. Phased array antennas work together to exploit these properties and generate a higher-gain or directional signal to a particular target. Thus, by adjusting the respective phase of each respective antenna in a phased array, various implementations can transmit signals in a desired direction. As one skilled in the art will appreciated, these examples of generating a desired signal radiation pattern using constructive and destructive interference via phase alterations has been simplified for discussion purposes.

Figure 2B:
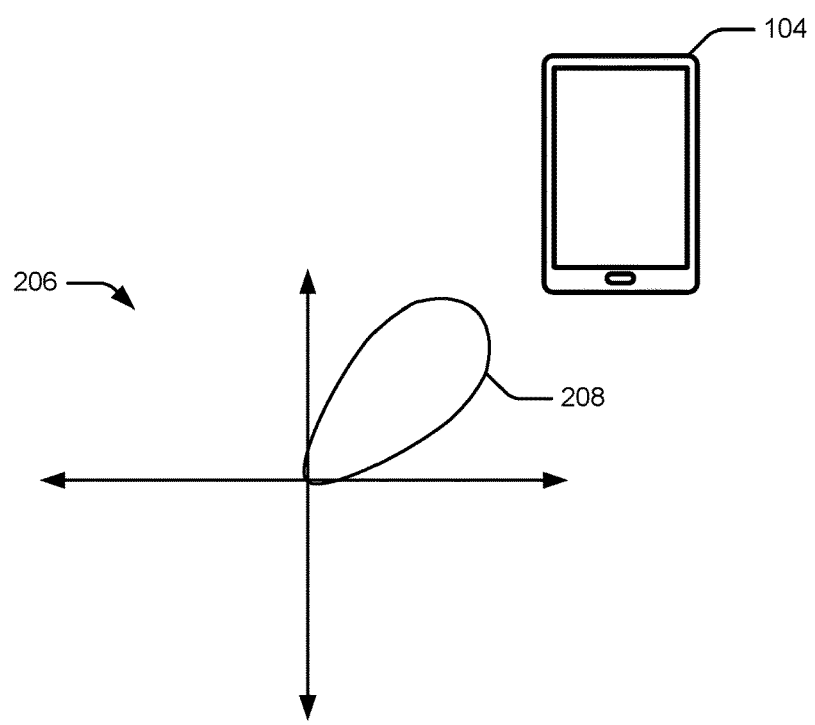

To demonstrate a targeted signal radiation pattern, consider FIG. 2b which illustrates a two-dimensional graph 206 that plots the main lobe of beam-formed radiation pattern 208. In some implementations, FIG. 2b illustrates an example of focusing beacon frames to a specific and/or particular location using beam-formed signals as further described herein. As in the case of radiation pattern 204, real-word implementations of radiation pattern 208 can vary due to physical variations in a corresponding implementation. FIG. 2b also includes user device 104 of FIG. 1 positioned in the upper right quadrant of graph 206. Here, radiation pattern 208 represents a beam-formed wireless signal transmitted in the direction of user device 104. Thus, if user device 104 moved from the upper right quadrant to the lower left quadrant, the connection established with radiation pattern 208 would break until the beam-formed wireless signal reforms to transmit in a direction associated with the lower-left quadrant.

Beamforming focuses energy towards a particular direction, which, in turn, increases the power of the corresponding signal since the signal is not dispersed as in the omnidirectional case. This can improve the corresponding SNR and allow the transmitting device to improve data rates (e.g., transmit more data further) and extend how far the transmitted signal can travel. This can also reduce the amount of noise or interference the transmitting device contributes to other devices, especially in a noisy environment. For instance, some work environments can include multiple wireless networking devices to service multiple user device. As the transmission patterns of the wireless networking devices overlap, they cause RF noise and/or interference to one another. By transmitting beam-formed directional signals, a wireless networking device can reduce the amount of interference and/or RF noise it introduces into another wireless networking device operating in an adjacent region. Thus, beam-formed wireless signals provide reduced RF noise, relative to omnidirectional wireless signals, when information, such as beacon frames, is continuously and/or periodically transmitted.

Having described differences between various radiation patterns, consider now a discussion of beacon transmission via beam-formed wireless signals in accordance with one or more embodiments.

Beacon Transmission Via Beam-Formed Wireless Signals

A wireless networking device provides a dynamic environment in which various user devices wirelessly connect and/or disconnect to the wireless networking device in order to gain access to a wired network. As a user device moves into and/or powers up within working range of the wireless networking device, the user device can request to connect to the wireless networking device. To facilitate this connection process, the wireless networking device can wirelessly advertise its presence by transmitting beacon frames. In turn, as a user device receives the beacon frame, the user device can locate the wireless networking device and participate in the connection process. As one such example, the IEEE 802.11 standards describe a periodic beacon frame transmitted by a wireless networking device to advertise its presence. The beacon frame, as described by IEEE 802.11, includes various types of information, such as time stamp information, network capacity information, supported transmission rates information, frequency information, and so forth. Upon receiving a beacon frame, the user device extracts the information, and uses it to facilitate communications and/or connect with the wireless networking device. The periodic nature of the beacon frame provides user devices with repetitive information such that if a user device misses part or all of a first beacon frame, the devices can obtain the missed information from a subsequent beacon frame. However, in regions that are crowded with multiple RF signals, the periodic transmission of beacons can add unwanted noise to other user devices.

Figure 3:
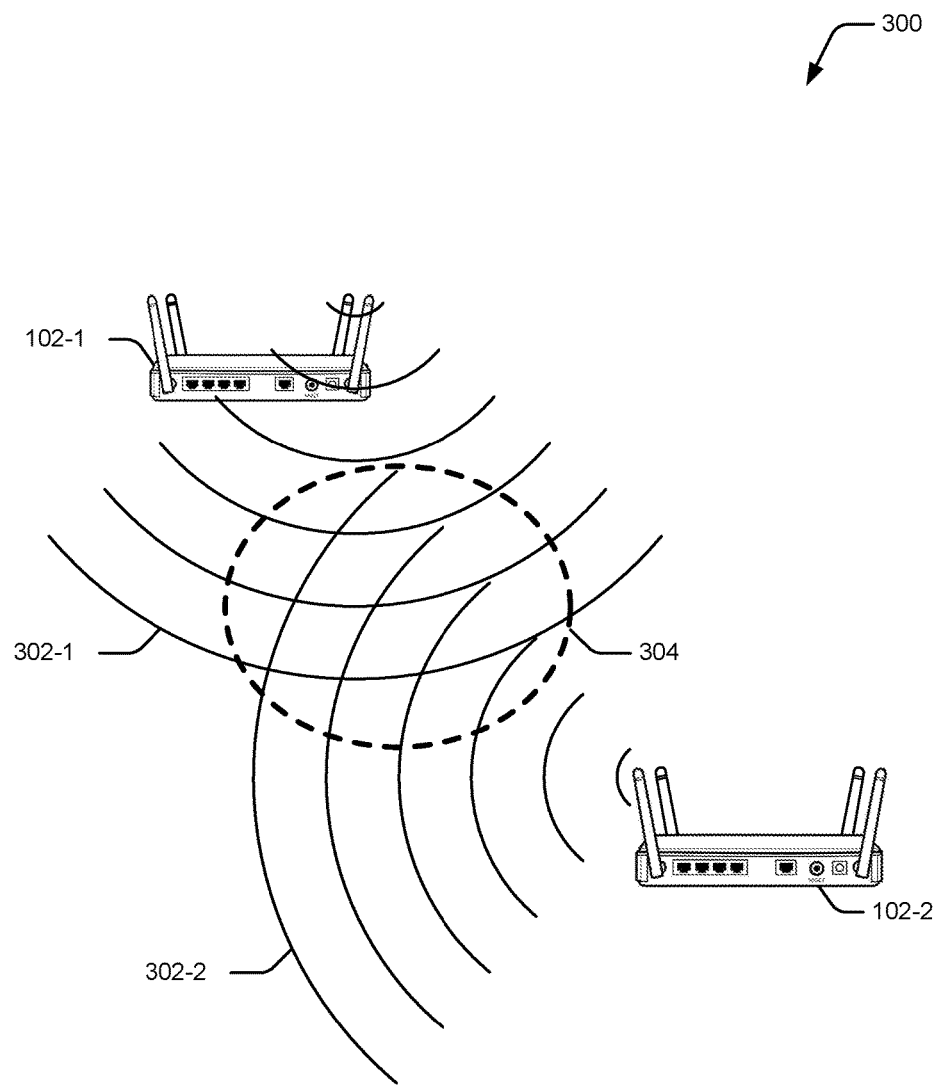
FIG. 3 illustrates an example of overlapping RF regions in accordance with one or more embodiments.

Consider FIG. 3 which illustrates an example environment 300. Environment 300 includes two instances of wireless networking device 102 of FIG. 1: wireless networking device 102-1 and wireless networking device 102-2. Here, each networking device transmits its own respective beacon frame via a corresponding wireless signal that has an omnidirectional radiation pattern. Thus, wireless networking device 102-1 transmits wireless signals 302-1 and wireless networking device 102-2 transmits wireless signals 302-2. Recall from discussions provided herein that an omnidirectional radiation pattern generally transmits equal energy in all directions, and tapers in signal strength as the signal radiates outwardly from its source. The term "generally" is used to indicate that real-world implementations of an omnidirectional radiation pattern can deviate from ideally transmitting exactly equal signal power in all directions. Depending upon their respective locations and/or signal strengths, the signals transmitted by the wireless networking devices, e.g., wireless signals 302-1 and wireless signals 302-2, may have regions of overlap. Here, in environment 300, region 304 represents a region in which wireless signals 302-1 and wireless signals 302-2 overlap. In some embodiments, this region of overlap creates unwanted RF noise and/or signal interference.

Consider an example in which wireless networking device 102-1 and wireless networking 102-2 are positioned within a same region and/or adjacent regions, such as the same building, at opposite ends of a room, positioned vertically above (or below) one other on different floors of the same building, different rooms that reside side-by-side, and so forth. In some embodiments, each wireless networking device services a different network. For instance, wireless networking device 102-1 may service a first private Wireless Local Area Network (WLAN) for a first company, and wireless networking device 102-2 may service a second private WLAN for a second company. Accordingly, user devices that have the authority to connect with wireless networking device 102-1 may not have authority to connect with wireless networking device 102-2, and vice versa. In view of this, beacon frames transmitted by wireless networking device 102-1 may be interpreted as RF noise by user devices that are unauthorized to connect with wireless networking device 102-1. Similarly, beacon frames transmitted by wireless networking device 102-2 may be interpreted as RF noise by user devices that are unauthorized to connect with wireless networking device 102-2. Thus, with respect to environment 300, regions with overlapping signals, such as region 304, have additional RF noise that can produce errors in the data transmitted and/or received by the user devices operating within the region.

Various embodiments transmit beacon frames using beamforming techniques. A wireless networking device uses a beam-formed wireless signal to transmit beacon frames in a particular direction and/or region. In some embodiments, the wireless networking devices bases the particular transmission direction on historical location data. By using a beam-formed wireless signal to transmit beacon frames, a wireless networking device can target a particular user device and/or region to which to transmit the beacon frames, which subsequently reduces RF noise interference to other user devices.

Figure 4:
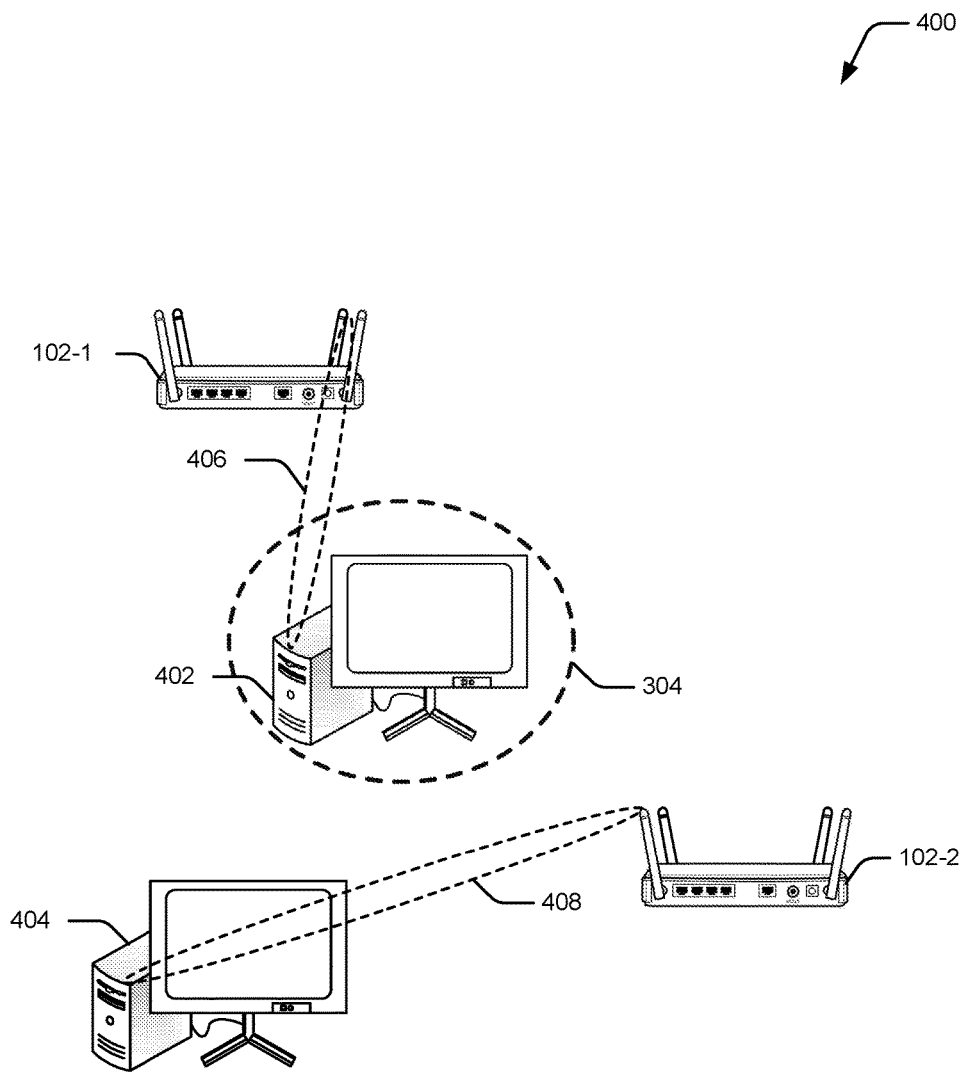
FIG. 4 illustrates an example of beacon frame transmission via beam-formed wireless signals in accordance with one or more embodiments.

To further demonstrate, consider now FIG. 4 which illustrates an example environment 400. Environment 400 includes two instances of wireless networking device 102 of FIG. 1: wireless networking device 102-1 and wireless networking device 102-2, and two user devices: user device 402 and user device 404, each of which are in the form of a desktop computing device. In environment 400, wireless networking device 102-1 and wireless networking device 102-2 are co-resident and/or within a proximity of one another such that if each wireless networking device transmitted an omnidirectional wireless signal, it would generate at least one region with overlapping signals. To illustrate this, environment 400 includes region 304 of FIG. 3 that includes overlapping RF signals.

Similar to that described with respect to environment 300, the user devices have different connection authorizations. In other words, user device 402 has authorization to connect with wireless networking device 102-1, but not wireless networking device 102-2. Accordingly, user device 402 interprets beacon frames transmitted by wireless networking device 102-2 as RF noise. Similarly, user device 404 has authorization to connect with wireless networking device 102-2, but not wireless networking device 102-1. Thus, user device 404 views beacon frames transmitted by wireless networking device 102-1 as RF noise.

In some embodiments, a wireless networking device transmits beacon frames using beam-formed wireless signals. In environment 400, wireless networking device 102-1 transmits beacon frames using beam-formed wireless signal 406. The direction of beam-formed wireless signal 406 can be based upon any suitable type of spatial location data, such as dynamically learned historical data, user-defined transmission direction and/or location information, etc. In turn, when user device 402 powers up and/or moves into a region covered by beam-formed wireless signal 406, it receives the beacon frames and extracts information that is then used to connect with wireless networking device 102. In a similar manner, wireless networking device 102-2 transmits beacon frames using beam-formed wireless signal 408. In turn, when it powers up and/or moves within range of beam-formed wireless signal 408, user device 404 receives the beacon frames and extracts information from them that is then used to connect with wireless networking device 102-2.

Since each wireless networking device in environment 400 transmits beacon frames via beam-formed wireless signals, environment 400 has less regions with overlapping RF signals relative to environment 300. For example, consider region 304. In environment 300, region 304 has overlapping RF signals from both wireless networking devices due to the transmissions having omnidirectional radiation patterns. However, in environment 400, region 304 includes beam-formed wireless signal 406, but not beam-formed wireless signal 408. Because of this, user device 402, which is illustrated as residing in region 304, receives little-to-no additional RF noise from beacon frames generated and transmitted by wireless networking device 102-2. Accordingly, transmitting beacon frames via beam-formed wireless signals can reduce RF noise to surrounding user devices.

Having described beacon frame transmission via beam-formed wireless signals, consider now a discussion of determining transmission directions for beam-formed wireless signals in accordance with one or more embodiments.

Dynamically Learning Transmission Locations for Beacon Frames

As further discussed herein, a wireless networking device can generate wireless signals with a selective spatial pattern, direction, and/or over a predefined coverage area of transmission by influencing the frequency, phase, and/or amplitude of each RF signal transmitted from a respective antenna. By analyzing and/or monitoring successful beamforming data transmissions to various connected user devices, such as by measuring various transmission parameters for a transmission channel used to connect with the user devices, a wireless networking device can direct future beacon frames to these known locations using beamforming techniques. To demonstrate, consider now FIGS. 5a-5c that illustrate an example environment 500 at various points in time. Here, FIG. 5a corresponds to example environment 500 at a first point in time, FIG. 5b corresponds to example environment 500 at a second point in time, and FIG. 5c corresponds to example environment 500 at a third point in time. The time period between these example figures can be any arbitrary amount of time, such as a time period measured in hours, days, weeks, minutes, seconds, etc. These different points in time collectively illustrate an example of dynamically learning directional information that is used to transmit beacon frames via a beam-formed wireless signal.

Environment 500 includes an example embodiment of wireless networking device 102 of FIG. 1 with multiple antennas: antenna 502-1, antenna 502-2, antenna 502-3, and antenna 502-4 respectively. In environment 500, wireless networking device 102 uses the multiple antennas to support both omnidirectional signal connections and beam-formed signal connections as further described herein. Environment 500 also includes a user device 504 that wishes to establish a communication path with a wireless networking device. However, in FIG. 5a, wireless networking device 102 lacks directional information corresponding to an expected location of user device 504. Accordingly, to advertise its presence to user devices in the surrounding area, wireless networking device 102 transmits beacon frames over omni-directional wireless signal 506. Here, wireless networking device 102 dedicates and/or uses antenna 502-2 for omnidirectional beacon frame transmissions, but the other antennas can be used as well. Since wireless networking device 102 includes multiple antenna, it can also transmit beacon frames and/or establish data communication paths with user devices using beam-formed wireless signals.

Multiple-User Multiple Input Multiple Output (MU-MIMO) technology, as described with respect to the IEEE 802.11ac standard, provides wireless networking devices with guidelines and/or standards on how to utilize beamforming techniques when connecting to user devices. MU-MIMO improves the speed and capacity of data delivered by a wireless networking device by using multiple antennas to deliver multiple beam-formed wireless signals simultaneously instead of time-slotting a single connection (e.g., partitioning the single connection in time to alternate what data goes to which device). However, based upon various limitations, the maximum number of antenna available for simultaneous beam-formed wireless communications is one less than the number of available antenna. As an example, wireless networking device 102 of FIG. 5a includes four antenna: antenna 502-1, antenna 502-2, antenna 502-3, and antenna 502-4. Based on MU-MIMO pairing, one example implementation reserves antenna 502-1 for omnidirectional beacon frame transmissions, and the rest of the antenna as various beamforming pairs (e.g., antenna 502-2 and antenna 502-3 as a beamforming pair, antenna 502-3 and antenna 502-4 as a beamforming pair, and antenna 502-2 and antenna 502-4 as a beamforming pair). These limitations stem from various conditions the wireless networking device has fulfill during data transmission, such as controlling areas of maximum constructive interference in order to direct the strongest signal to a desired client, controlling areas of maximum destructive interference to reduce signal interference at other devices, and so forth. Thus, since wireless networking device 102 includes four antennas in FIGS. 5a-c, the wireless networking device can transmit three beam-formed wireless signals simultaneously. For discussion purposes, this description identifies pairs of antenna that are used to generate beam-formed wireless signals, but it is to be appreciated that any combination and/or number of antenna can be combined to generate beam-formed wireless signals without departing from the scope of the claimed subject matter.

Figure 5A:
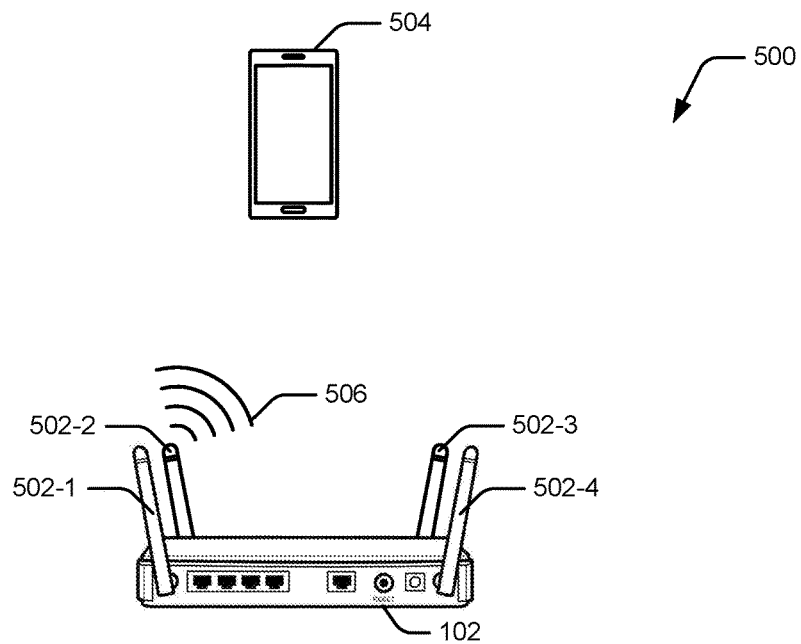
FIGS. 5a-5c illustrate an example of dynamically learning directional information in accordance with one or more embodiments.
Figure 5B:
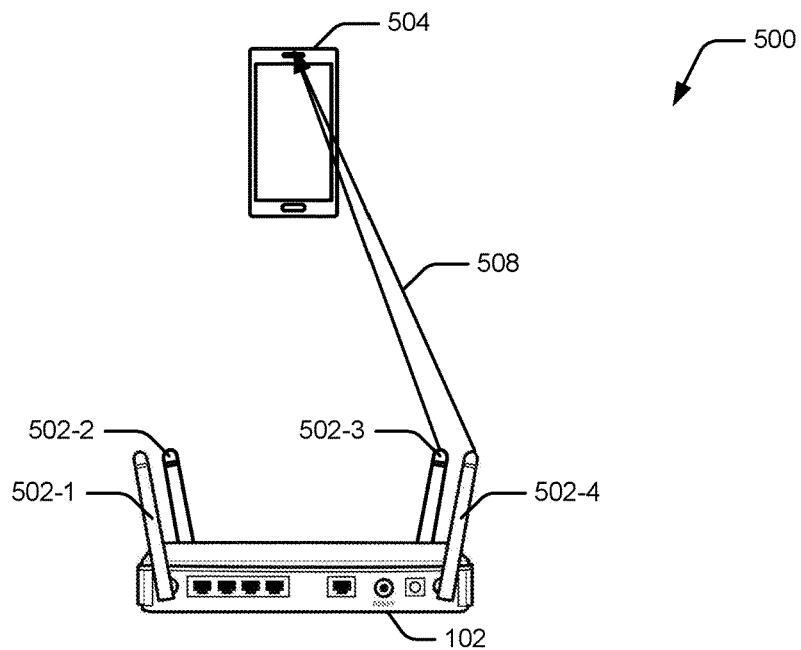

Returning to environment 500 in FIG. 5a, user device 504 receives at least some of the beacon frames transmitted via omnidirectional wireless signal 506, extracts information from the beacon frames, and subsequently communicates with wireless networking device 102 to establish a data connection. In some embodiments, user device 504 communicates its capabilities during an association request and/or response to wireless networking device 102, such as communicating that it has the ability to support beam-formed connections. Thus, in FIG. 5b, wireless networking device 102 establishes a data connection with user device 504 using a beam-formed wireless signal 508. Initially, the direction of beam-formed wireless signal 508 can be based upon information transmitted by user device 504 to wireless networking device 102 during a data transmission process where beamforming is maintained. Alternately or additionally, wireless networking device 102 can dynamically learn what direction to transmit beam-formed wireless signal 508 as further described herein. In turn, the learned information can be stored in a location database and used for subsequent beacon frame transmissions. In this example, wireless networking device 102 transmits beam-formed wireless signal 508 using antenna 502-3 and antenna 502-4, but wireless networking device 102 can generate beam-formed wireless signal 508 using any other combination of antennas. While not illustrated in FIG. 5b, wireless networking device 102 can alternately or additionally transmit beacon frames simultaneously with beam-formed wireless signal 508 using antenna 502-2 and omnidirectional wireless signal 506.

By learning spatial location and/or directional information about a successful beam-formed connection, a wireless networking device can improve a success rate of data transmission to user devices using beam-formed signals for beacon frame transmissions. Additionally, using learned spatial location information through a Wi-Fi connection can help improve the success rate of connecting to the user device by focusing the beam to a specific location. To demonstrate, consider an example in which a user device in the form of a desktop computer connects to a wireless networking device. While a user can move a desktop computer between various locations, the user is more likely keep the desktop computer in a fixed location to eliminate disconnecting and reconnecting various peripherals and/or cords. Based upon this, a wireless networking device can dynamically learn and/or identify the location of the desktop computer each time the user device connects with the wireless networking device by monitoring and/or analyzing successful data transmissions via beamforming to the desktop computer. In turn, by storing the learned location information and/or transmission parameters used to connect to the desktop computer in a database, the wireless networking device can use this information in the future to focus the transmission signal energy directly to the desktop computer. In other words, as the desktop computer communicates with the wireless networking device via beamforming, the wireless networking device can dynamically learn transmission parameters, reception angles, and/or spatial location information about the connection, and dynamically generate a new, and/or reform an existing, beam-formed wireless signal for future beacon frame transmissions.

Figure 5C:
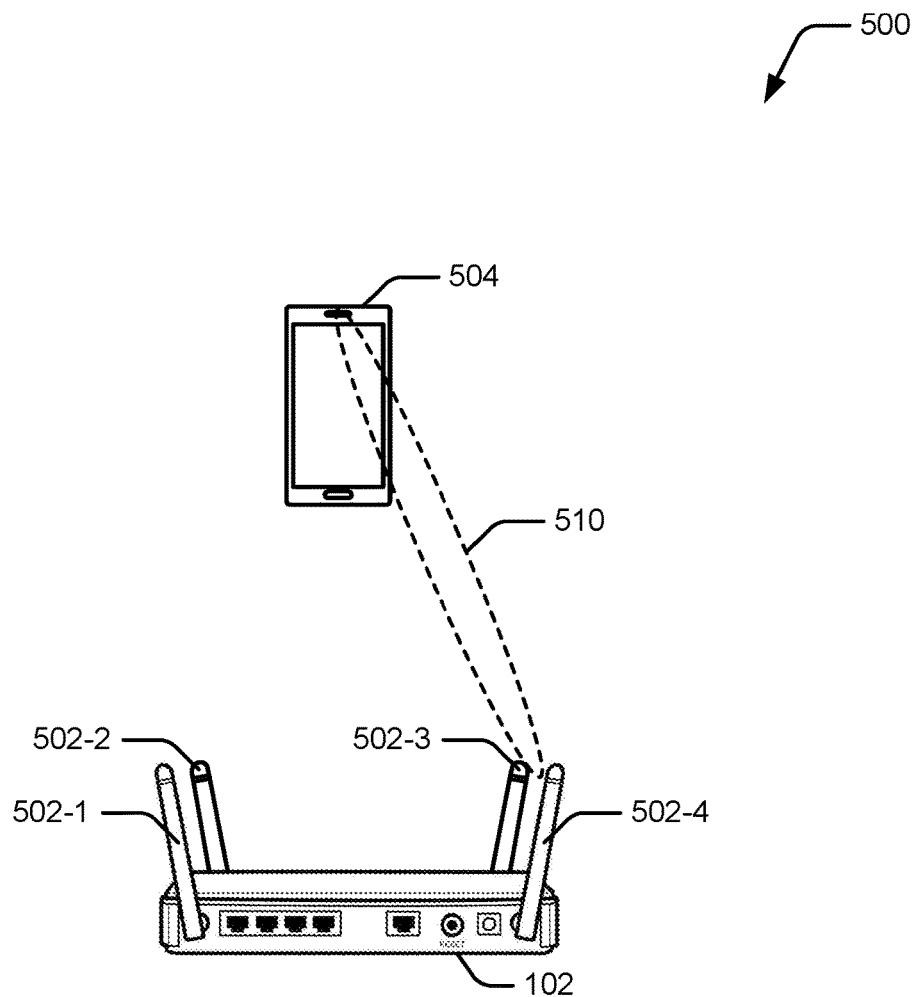

In FIG. 5c, wireless networking device 102 uses learned location information and/or transmission parameters from its previous connection to user device 504 to configure beam-formed wireless signal 510 for beacon frame transmissions. While this example describes configuring a beam-formed signal using learned information from a single connection, other implementations can combine the learned information in any suitable manner, such as an average of information collected from multiple user devices, preprogrammed information, default information, and so forth. Accordingly, wireless networking device 102 can analyze and/or combine the stored location information to determine how to configure a beam-formed wireless signal for beacon transmission instead of transmitting the beacons via an omnidirectional wireless signal. As one example, some embodiments of wireless networking device 102 use stored location information to generate a probability map.

A probability map identifies locations that have a higher likelihood or probability of successful data transmissions via beamforming and/or connections to user devices relative to other locations. For instance, a wireless networking device can analyze the historical location data stored in the location database and identify various operating locations associated with user device connections. In turn, the wireless networking device can assign a probability value and/or metric to each location that gives an indication of the probability of a successful user device connection at that location. The wireless networking device can generate these values and/or metrics using statistical analyses, such as an average of connections at that location relative to the total number of connections, a median value of successful connections over a range of locations, a number of successful user device connections at a location, and so forth. In turn, the wireless networking device can chose a location (or a range of locations) that has a high probability of successful user device connections, and transmit beacon frames in that direction using a beam-formed wireless signal. Alternately or additionally, the wireless networking device can identify locations that have a low probability of successful data transmissions via beamforming to user devices relative to other locations, and transmit beacon frames with null values towards those locations to reduce RF noise in that region.

Figure 6:
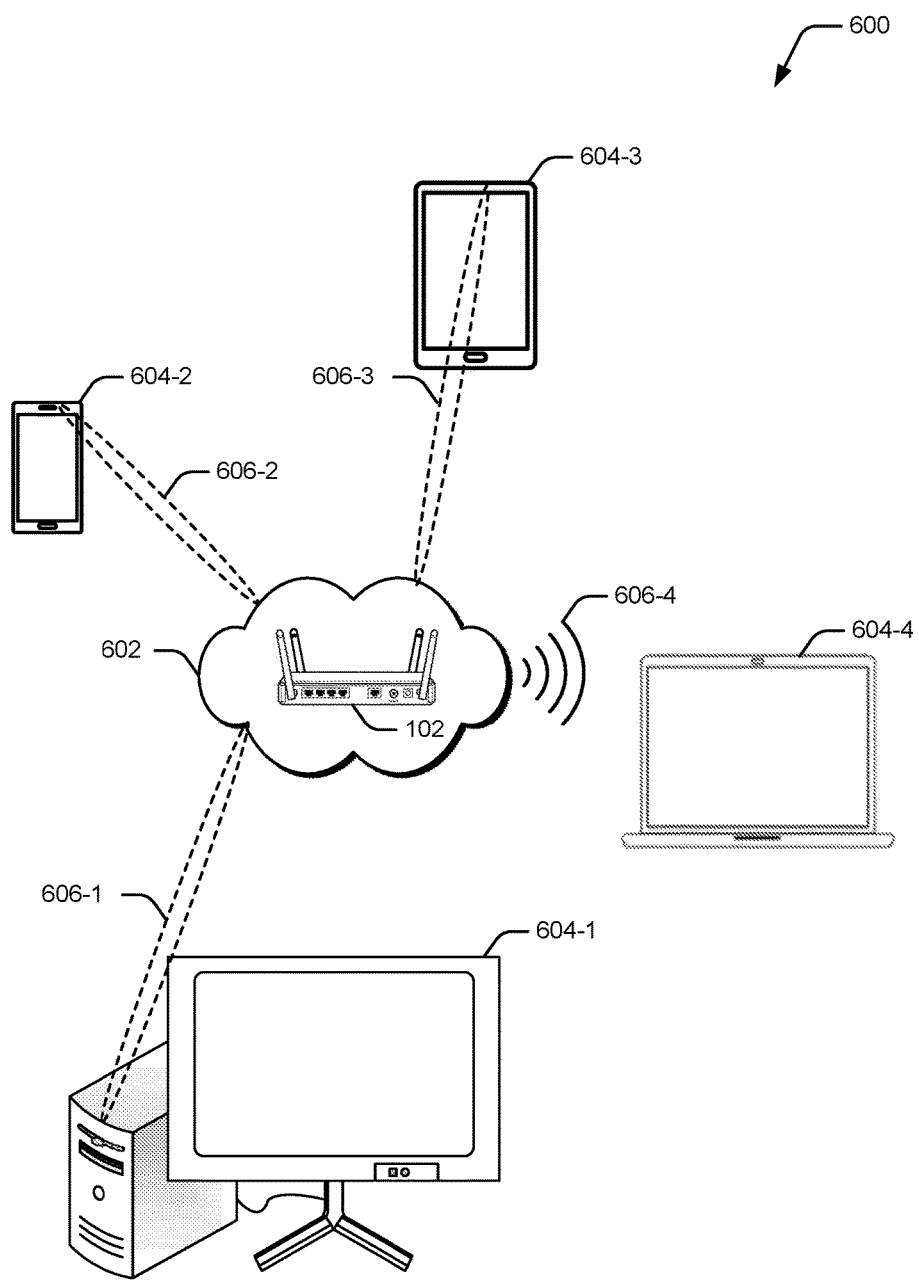
FIG. 6 illustrates an example of a wireless networking device employing multiple wireless signals for beacon transmission in accordance with one or more embodiments.

By identifying locations with successful connections and/or data transmissions via beam-formed wireless signals, the wireless networking device can transmit beacon frames using beam-formed wireless signals to various types of devices at various locations with a statistically higher probability of successfully reaching devices relative to transmitting beam-formed wireless signals without the use of location information. To demonstrate this, consider FIG. 6 that illustrates environment 600 in which wireless networking device 102 of FIG. 1 transmits various beacon frames to different user devices using beamforming techniques. Here, wireless networking device's ability to transmit wireless signals (whether omnidirectional wireless signals and/or beam-formed wireless signals) is generally represented by cloud 602. The term "generally" used here indicates that wireless networking device 102 can use any combination of antenna, antenna pair, and/or antenna arrays of the available antenna to generate these various signals. Thus, for simplicity's sake, the transmission of the various signals in environment 600 are illustrated as generating from cloud 602, rather than any specific antenna combination(s) of wireless networking device 102.

Environment 600 includes four different user devices at varying locations: user device 604-1 in the form of a desktop computer, user device 604-2 in the form of a smart phone, user device 604-3 in the form of a tablet, and user device 604-4 in the form of a laptop. Consider now that wireless networking device 102 that had successful data transmissions over beam-formed wireless signals with three of the four user devices. As further described herein, various implementations of the wireless networking device store location information about these successful past data transmissions, and subsequently use the stored location information to focus beacon frames (via beam-formed wireless signals) to these locations to improve the probability of a successful data transmission and/or user device connection at each location. Thus, wireless networking device 102 determines to transmit beacon frames to a first location corresponding to user device 604-1 using beam-formed wireless signal 606-1, to a second location corresponding to user device 604-2 using beam-formed wireless signal 606-2, and to a third location corresponding to user device 604-3 using beam-formed wireless signal 606-3. Alternately or additionally, wireless networking device 102 can have an antenna dedicated to transmitting beacon frames over an omnidirectional wireless signal as further describe herein. Accordingly, in environment 600, user device 604-4 receives beacon frames via omnidirectional wireless signal 606-4.

The location information used to configure a beam-formed wireless signal can include various characteristics and/or parameters associated with a corresponding transmission channel. For example, the various characteristics used to determine transmission parameters and/or spatial location information can include signal strength, reception angles, transmission angles, round-trip-times (RTT), and so forth. As one illustration, RTT can be used to help further define the range and/or transmission power of the beacon frame which, in turn, can help reduce the interference and/or noise in the area. The determination of a transmission level (via RTT analysis) can also help conserve the battery of the network by only transmitting at a power level corresponding to a range analysis, rather than transmitting at a power that goes past the determined range. Some implementations of a wireless networking device generate and/or learn spatial location information of the connected user device using these various characteristics. In storing the spatial location information as further described herein, some implementations store the various characteristics associated with the transmission channel as part of, and/or with, the spatial location information. Alternately or additionally, a wireless networking device can initially use location information acquired from a user device during the association process (e.g., Wi-Fi location information), and then subsequently learn location information associated with the user device by analyzing successful data transmissions via a beam-formed signal as further described herein.

Figure 7:
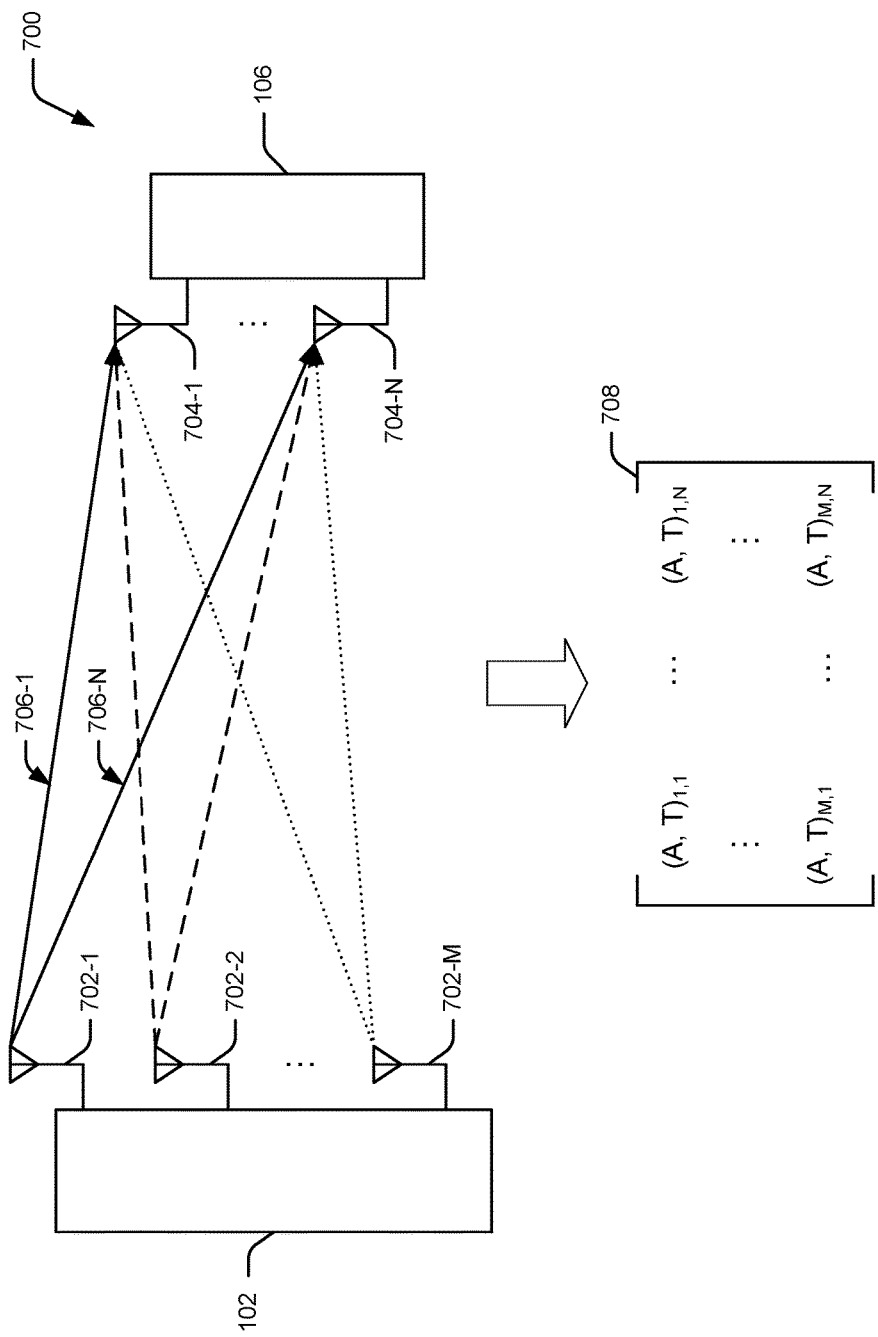
FIG. 7 illustrates an example of using sounding frames to dynamically learn directional and/or spatial location information associated with the user device in accordance with one or more embodiments.

Consider FIG. 7, which illustrates an example environment 700 that includes example implementations of wireless networking device 102 and user device 106 of FIG. 1. Each respective device in environment 700 includes multiple antenna, thus making each device capable of supporting beam-formed wireless signals. Wireless networking includes antenna 702-1, antenna 702-2, to antenna 702-M, where M is an arbitrary number. Similarly, user device 106 includes antenna 704-1 to antenna 704-N, where N is an arbitrary number. The values of M and N can be any combination of values, and can have any relationship (e.g., M=N, M>N, etc.). To dynamically learn spatial location information and/or directional information about a receiving user device, wireless networking device 102 first connects with user device 106 in a manner similar to that described with respect to FIGS. 5a and 5b. In turn, wireless networking device 102 gathers various characteristics about the connection. Some implementations transmit sounding frames as a way to gather the characteristics and/or location information.

A sounding frame is a data frame that is used to gather characteristics about a transmission and/or transmission channel. The sounding frame can use any suitable type of information, such as a training sequence with a known pattern, a NULL data packet, information about which antenna transmitted the information, a transmission frequency, a transmission time, and so forth. In turn, a receiving device can uses the known data pattern and/or information to take measurements and/or observations about the sounding frame as it is received. For example, if the receiving device knows what training sequence to expect, it can generate measurements on how close the actual received signal with the training system follows the theoretical or ideal signal for that training signal. Alternately or additionally, the receiving device can perform other types of measurements, such as such as signal strength, time of receipt, angle of receipt, and so forth. In turn, the receiving device can transmit the measured information and/or feedback to the transmitting device on what has been observed.

In environment 700, wireless networking device 102 alternates the transmission of a sounding frame on each of its respective antenna to each respective antenna of user device 106. In other words, wireless networking device 102 uses a first antenna to alternate transmitting a sounding fame to each antenna of user device 106. With respect to environment 700, this translates to wireless networking device 102 initially using antenna 702-1 to transmit sounding frame 706-1 to antenna 704-1 of user device 106. Upon receiving sounding frame 706-1 on antenna 704-1, the user device generates measurements that indicate how it received the sounding frame. Any suitable type of measurement can be generated, such as the received sounding frame's amplitude (A) and receipt of time and/or time difference (T). However, as one skilled in the art will appreciated, other types of measurements can be measured as well, such as angle of arrival, RTT, signal phase information, etc.

Continuing on, the wireless networking device again uses antenna 702-1 to transmit a sounding frame, but redirects the sounding frame from antenna 704-1 to a second antenna of user device 106. In turn, the wireless networking device then uses antenna 702-1 to redirect the sound frame from the second antenna of user device 106 to a third antenna of user device 106, and so forth, until wireless networking device concludes the sounding frame transmissions from antenna 702-1 by transmitting sounding frame 706-N to antenna 704-N. As user device 106 receives each sounding frame from the wireless networking device, it generates the desired measurements and stores them in matrix 708. Thus, in this example, the first row of matrix 708 generated by user device 106 includes amplitude and time measurements for each sounding frame transmitted by antenna 702-1 and the respective antenna of user device 106 that it was received and measured on. This process repeats itself, such that wireless networking device 102 next transmits sounding frames using antenna 702-2 to each receiving antenna of user device 106, and so forth, with the sounding frame transmission process concluding with wireless networking device 102 transmitting sounding frames via antenna 702-M.

As further described herein, user device 106 records and or measures various types of information about each respective sounding frame to generate matrix 708. As such, matrix 708 includes respective measurements for each respective antenna combination of the 1:M antenna of the wireless networking device, and the 1:N antenna of the user device. Upon completing the sounding frame measurements, the user device transmits the matrix to the wireless networking device for processing. In some implementations, the wireless networking device processes the received matrix, such as by performing a matrix inversion, correcting for noise, extracting phase information, angle information, and so forth. Here, the matrix has M×N elements and includes amplitude and time information, but other sizes and/or types of measured information are suitable as well. Using the data generated in matrix 708, the wireless networking device dynamically learns spatial location and/or directional information about user device 106.

In other embodiments, the wireless networking device transmits a request to a user device for a sounding frame. In turn, as the wireless networking device receives sounding frames transmitted by the user device, the wireless networking device generates measurements and/or observations about how the sounding frame is received on each antenna (e.g., signal strength, time of receipt, angle of receipt, etc.), and subsequently configures its antennas to reform a beam-formed wireless signal based upon its observations. As in the example of the wireless networking device transmitting the sounding frame, a user device transmitting sounding frames allows the wireless networking device to dynamically learn location information, and subsequently reform existing, or generate new, beam-formed wireless signals through antenna configurations to improve the reception of a signal by a user device.

These observations and/or measurements, whether generated by the user device or the wireless networking device, can be stored in a database for future use, such as location database 116 of FIG. 1. For example, referring to the described example of a matrix of angles of arrival generated by a user device, some embodiments store the matrix of angles of arrival in the database. Alternately or additionally, the database can include an association with a particular user device, such associating a particular set of information with user device 504. In turn, some embodiments of the wireless networking device analyze the stored information to identify and/or generate historical usage information about previous successful beam-formed wireless signal connections.

By analyzing location data stored in the database, a wireless networking device can identify a range of angles and/or locations that have statistically more successful user device connections relative to other angles and/or locations. In turn, the wireless networking device can direct beacon frames to these angles and/or locations with beamforming techniques, and/or learned Wi-Fi location information as provided by Wi-Fi protocol techniques, to reduce RF noise in other locations. The wireless networking device can select historical location data in any suitable fashion. For instance, the wireless networking device can select location information specific to a particular user device (e.g., a transmission direction associated with user device 504). Alternately or additionally, the wireless networking device can select location information to reach multiple user devices. For example, the wireless networking device can analyze the historical location data to find a range of transmission angles with the highest success of user device connections, and use this range of transmission angles to generate a triangular or "pie-shaped" beam-formed wireless signal that corresponds to the range of transmission angles (e.g., a range from 0-90°, 15°-75°, etc.). It is to be appreciated that while the range of transmission angles may, in theory, generate an exact transmission shape (such as a triangular-shaped transmission pattern), real-world embodiments can generally deviate from the exact shape without departing from the scope of the claimed subject matter. Thus, the wireless networking device can form beam-formed wireless signals to transmit over a predefined overage area with any suitable shape and/or size.

Some embodiments of the wireless networking device dynamically adjust to changes in location. For instance, consider an example in which the wireless networking device identifies a first location and/or direction that has the most successful connections with user devices, and directs beacon frames to that first location. Subsequently, if the location and/or direction of the most successful connections moves to a second location over time, the wireless networking device can dynamically adjust to this change. As another example, consider a new wireless networking device which a user has purchased and is turning on for the first time. As further described herein, the wireless networking device can begin transmitting beacon frames using an omnidirectional radiation pattern as a default startup configuration, or a beam-formed wireless signal based upon a pre-programmed direction. Once the wireless networking device acquires location data, it can dynamically change the direction in which the beacon frames are transmitted via beamforming or dynamically change from an omnidirectional wireless signal to a beam-formed wireless signal using the newly learned location information. Accordingly, the wireless networking device can dynamically adapt to new information as it is learned. In other words, over time, the wireless networking device can dynamically alter the transmission angles and/or locations to base beam-formed wireless signals using historical location data, rather than the pre-programmed value or a default startup configuration. Thus, the wireless networking device can dynamically learn new locations of user devices that successfully connect to the wireless networking device, and transmit beacon frames to the new location by dynamically reconfiguring an existing beam-formed wireless signal or generating a new beam-formed wireless signal.

In some embodiments, the wireless networking device provides an interface that allows a user to program in a desired transmission direction and/or shape for a beam-formed wireless signal. The wireless networking device can provide any suitable type of interface, such as a visual display, soft keys, a touchscreen interface, mechanical and/or virtual buttons, data ports, and so forth. For instance, a user can physically connect to a data port with a cable and/or keyboard to transmit and/or receive commands used to program various types of transmission parameters (e.g., transmission angles, transmission shape, transmission size, transmission frequency, spatial location information, etc.). Alternately or additionally, the user can establish a wireless connection with the wireless networking device (via a user device) to wirelessly transmit and/or receive commands and/or the transmission parameters, or active various buttons (whether mechanical or virtual) in predefined sequences to enter information used to define transmission patterns and/or directions of beam-formed wireless signals. In embodiments where the wireless networking device provides a touchscreen display, the user can program transmission parameters by interacting with the touchscreen display using various input gestures. Upon receiving the transmission parameters, the wireless networking device can apply them to a currently transmitted wireless signal to reform and/or reconfigure the signal and/or store the transmission parameters in the location database for future use.

Figure 8:
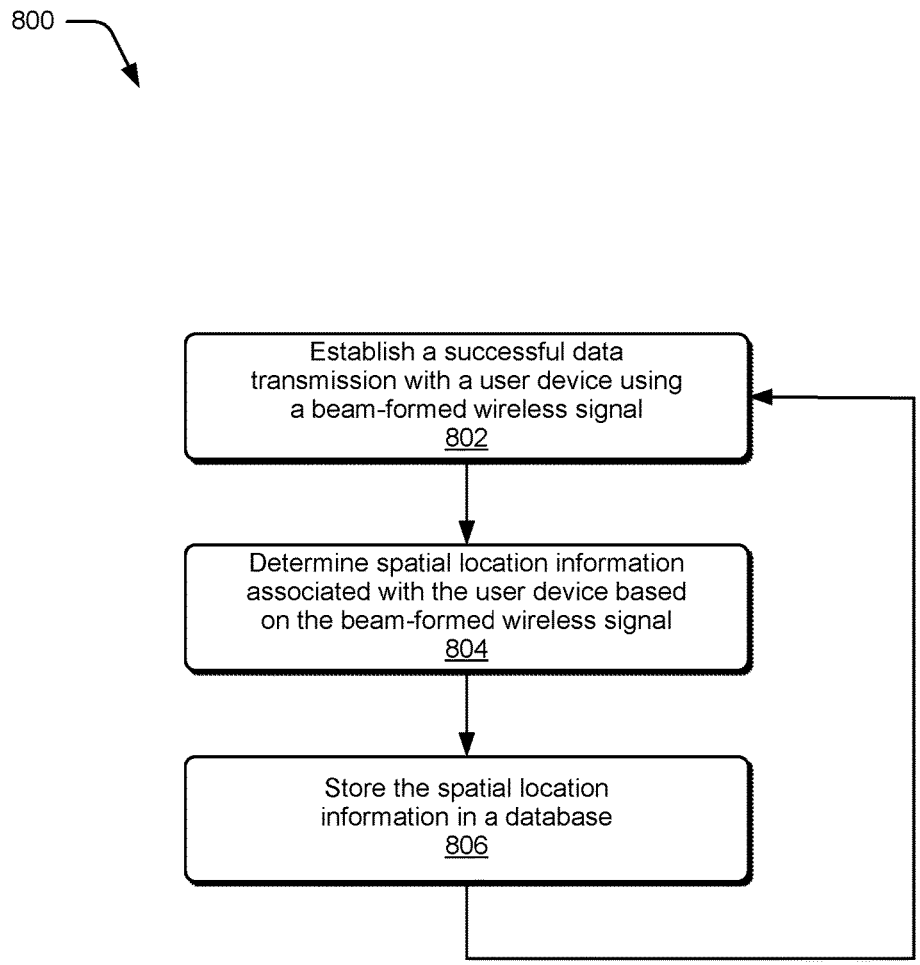
FIG. 8 is a flow diagram that illustrates operations of dynamically determining location information based on successful data transmissions to a user device in accordance with one or more embodiments.

FIG. 8 illustrates an example method 800 that dynamically learns location information in accordance with one or more embodiments. Generally, any services, components, modules, methods, and/or operations described herein can be implemented using software, firmware, hardware (e.g., fixed logic circuitry), manual processing, or any combination thereof. For instance, method 800 can be performed by tracking module 112 and/or beacon management module 114 of FIG. 1. Some operations of the example method may be described in the general context of executable instructions stored on computer-readable storage memory that is local and/or remote to a computer processing system, and implementations can include software applications, programs, functions, and the like. Alternately or in addition, any of the functionality described herein can be performed, at least in part, by any combination of hardware, software and/or firmware. While method 800 illustrates steps in a particular order, it is to be appreciated that any specific order or hierarchy of the steps described here is used to illustrate an example of a sample approach. Other approaches may be used that rearrange the ordering of these steps. Thus, the order steps described here may be rearranged, and the illustrated ordering of these steps is not intended to be limiting.

At block 802, the wireless networking device establishes a successful data transmission with a user device using a beam-formed wireless signal. Establishing the data transmission can include a multiple-step process in which the wireless networking device first transmits beacon frames to advertise its presence, and then subsequently establishes the connection with a user device that detects the beacon frames. With respect to the advertising its presence, the wireless networking device can transmit beacon frames over an omnidirectional wireless signal, or transmit beacon frames over a beam-formed wireless signal using default and/or user-defined transmission parameters. Upon receiving the beacon frames, the user device can extract information that can be used to communicate data with the wireless networking device. When the user device supports beam-formed wireless connections, the established connection can include data transmissions via a beam-formed wireless signal. Any suitable combination and/or number of antenna can be used to generate the beam-formed wireless signal. In some implementations, the wireless networking device uses and/or dedicates a subset of its total antenna to communicate and/or successfully transmit data with the user device via the beam-formed wireless signal.

At block 804, the wireless networking device determines spatial location information associated with the user device based on data transmissions via the beam-formed wireless signal. For instance, some embodiments of the wireless networking device transmit and/or receive sounding frames based on the first-beam-formed wireless signal to obtain, collect, and/or determine location information and/or transmission parameters, such as reception angles at a user device, transmission angles at the wireless networking device, RTT, average/mean of the RTT, and so forth. Alternately or additionally, some embodiments use the various metrics, measurements, and/or protocols provided by IEEE 802.11 to determine and collect the spatial location information. As an example, the wireless networking device can query an associated MAC layer for the various metrics and/or measurements obtained from the user device during communication exchanges. As other examples, the user device can provide location information via Wi-Fi location data and/or RTT information as further described herein.

Responsive to determining the spatial location information, the wireless networking device stores the spatial location information in a database at block 806. Storing the spatial location information can include aggregating the spatial location information with previously learned information. For example, upon storing the spatial location, the method returns to block 802 to continue establishing new and/or reoccurring connections to various user devices using beam-forming techniques. This allows the wireless networking device to continuously identify transmission directions and/or spatial location information based on data transmissions associated with these connections, and update the location information and/or transmission parameters stored in the database as further described herein. The updating process can include aggregating newly learned spatial location information and/or transmission parameters with those currently stored in the database. Accordingly, in various implementations, returning to block 802 signifies data transmissions (via beam-forming techniques) to a new and/or different user device than in previous passes of the method.

Figure 9:
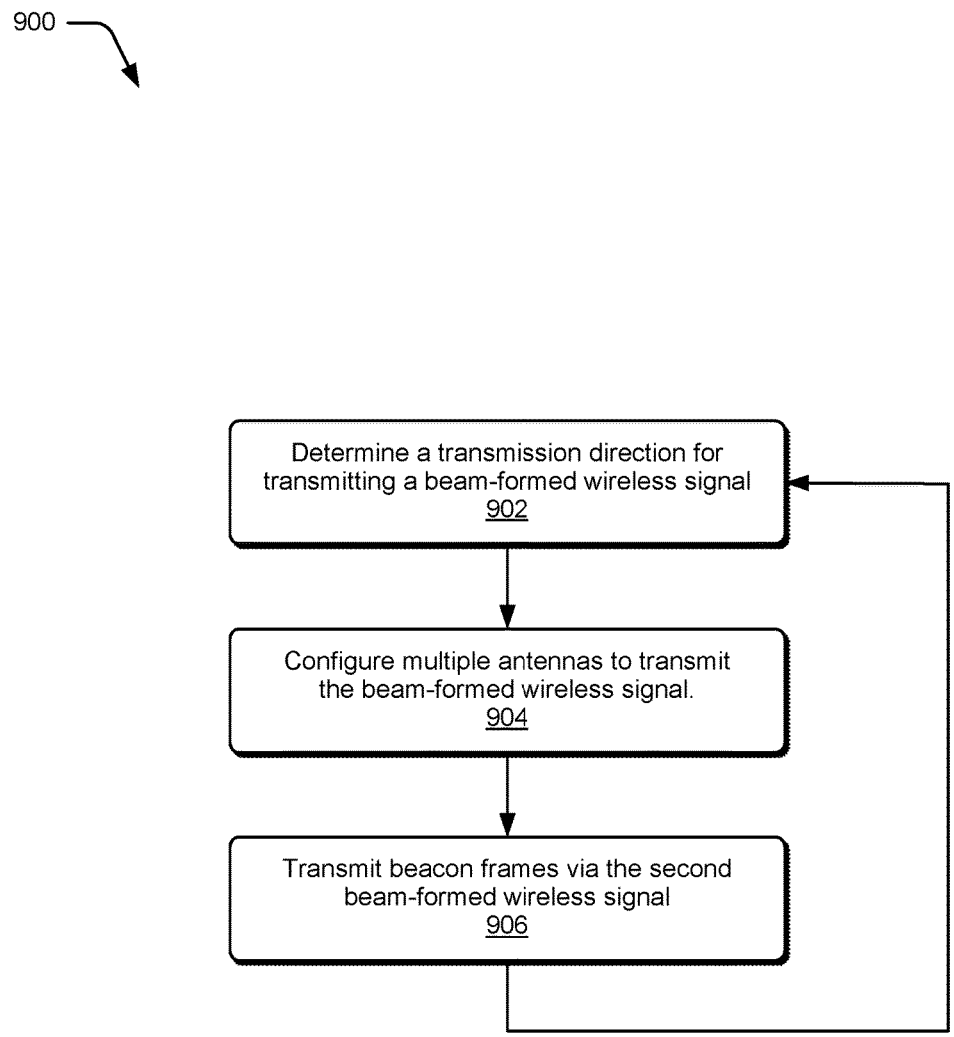
FIG. 9 is a flow diagram that illustrates operations of dynamically focusing the direction of beacon frame transmissions based on learned location information in accordance with one or more embodiments.

Now consider FIG. 9 illustrates an example method 900 that transmits beacon frames on a beam-formed signal using location information dynamically determined from previous connections to user devices. In some implementations, method 900 can be considered a continuation of the example method described with respect to method 800. Generally, any services, components, modules, methods, and/or operations described herein can be implemented using software, firmware, hardware (e.g., fixed logic circuitry), manual processing, or any combination thereof. For instance, method 900 can be performed by tracking module 112 and/or beacon management module 114 of FIG. 1. Some operations of the example method may be described in the general context of executable instructions stored on computer-readable storage memory that is local and/or remote to a computer processing system, and implementations can include software applications, programs, functions, and the like. Alternately or in addition, any of the functionality described herein can be performed, at least in part, by any combination of hardware, software and/or firmware. While method 900 illustrates steps in a particular order, it is to be appreciated that any specific order or hierarchy of the steps described here is used to illustrate an example of a sample approach. Other approaches may be used that rearrange the ordering of these steps. Thus, the order steps described here may be rearranged, and the illustrated ordering of these steps is not intended to be limiting.

At block 902, a wireless networking device determines transmission parameters for transmitting a beam-formed wireless signal, such as by dynamically learning the transmission parameters and/or locations associated with current and/or past beam-formed connections with various user devices as described in FIG. 8. Alternately or additionally, some embodiments of the wireless networking device analyze a location database that includes historical spatial location data about previously connected user devices. This can include generating a probability map to identify locations and/or transmission parameters associated with a higher probability of successful user device connection relative to other locations, a transmit power transmission configuration based on the average distance of historically connected devices, RTT information, etc. As another example, the wireless networking device can analyze the stored information to identify a direction associated with a particular user device and/or a user-defined preference. However, other types of analyses can be performed as well, such as a range analysis that identifies a range of angles and/or directions with successful connections relative to other ranges, an analysis that identifies a median or average direction from the stored spatial location information, and so forth. Some embodiments of the wireless networking device determine the transmission parameters and/or direction based upon privacy and/or security. For example, the wireless networking device can identify the locations of unauthorized user devices, and redirect the beam-formed wireless signal that transmits the beacon frames to avoid and/or exclude locations corresponding to the unauthorized user devices, thus effectively hiding its presence from unauthorized users. Alternately or additionally, the wireless networking device can transmit null beacon frames to locations identified as being associated with unauthorized user devices.

At block 904, the wireless networking device configures multiple antennas to transmit a beam-formed wireless signal based on the transmission direction determined at block 902. Here, the transmission of the beam-formed wireless signal are configured to focus the beacon frames to a particular user device and/or region. In some implementations, the wireless network device reconfigures antenna to redirect and/or reform a current beam-formed wireless signal to a new direction based on the location information and/or transmission parameters determined at block 902. Alternately or additionally, the wireless network device can select a new (unused) set of antenna to transmit the beam-formed wireless signal. Accordingly, the wireless networking device can use and/or reuse any subset of antenna to transmit the beam-formed wireless signal, where any suitable combination and/or number of antenna can be used to transmit the beam-formed wireless signal. Responsive to configuring the multiple antennas, the wireless networking device focuses the transmission of beacon frames to a particular region and/or user device, and transmits beacon frames via the beam-formed wireless signal at block 906. The method then returns to block 902 to continue determining new transmission parameters and/or location information used to focus the transmission of beacon frames to a particular user device and/or region. Thus, the wireless networking device can dynamically focus where beacon frames are transmitted by using learned spatial location information to form and/or reform beam-formed wireless signals.

By transmitting beacon frames using beamforming techniques, a wireless networking device can reduce the RF noise it contributes to unintended users relative to omnidirectional radiation patterns. By tracking and using historical spatial location data associated with successful connections to determine a direction in which to transmit beacon frames, the wireless networking device also increases its privacy and/or security since unintended user devices are less likely to be positioned in the direction of the beam-formed wireless signal. Tracking the spatial location data allows the wireless user device to more accurately locate the position of a user device relative to other positioning techniques, particularly when the user device is located indoors. This improved indoor positioning information can help interested parties more accurately detect which user devices are connecting with the wireless networking device, and where they are located.

Having considered a discussion of determining transmission directions for beacon frames via beam-formed wireless signals in accordance with one or more embodiments, consider now example computing devices that can implement the various embodiments described above.

Example Device

Figure 10:
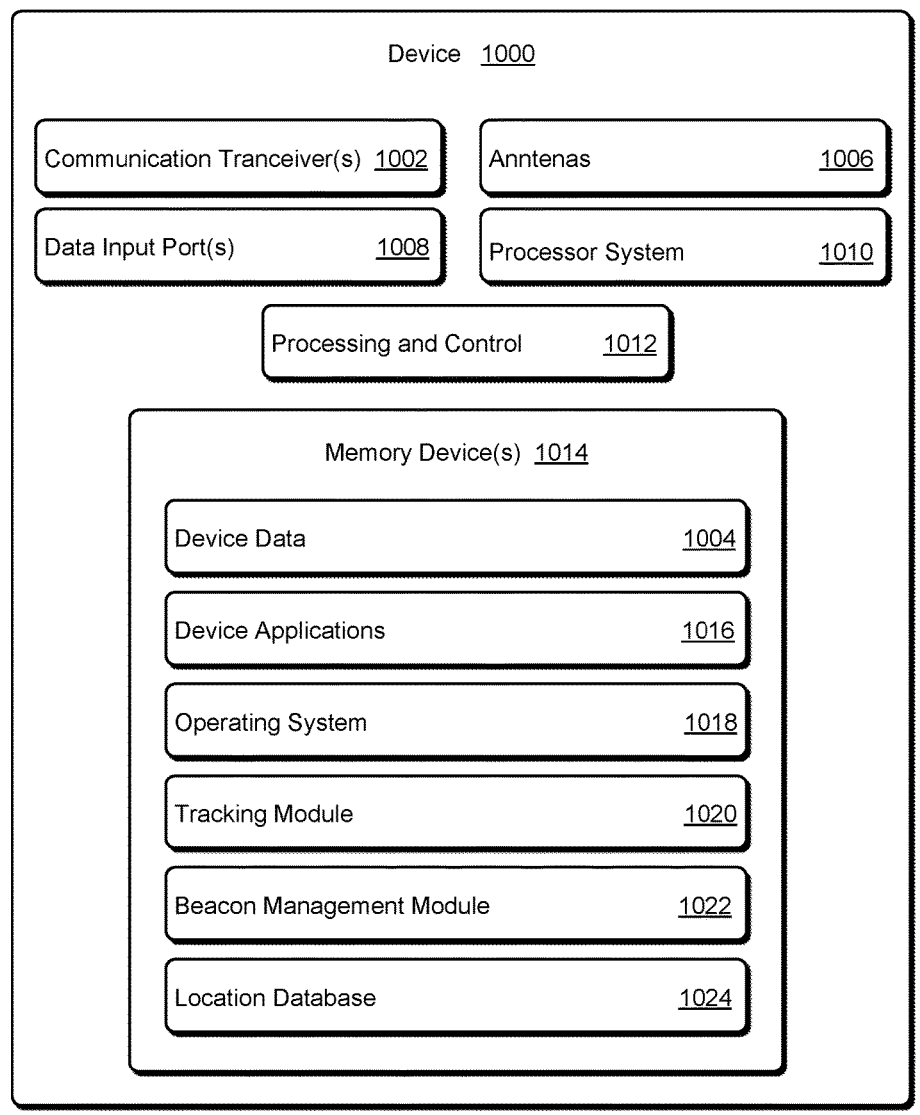
FIG. 10 illustrates various components of an example device that can implement various embodiments.

FIG. 10 illustrates various components of an example device 1000 in which transmission of beacon frames using beamforming techniques can be implemented. Electronic device 1000 can be, or include, many different types of devices capable of implementing dynamic connectivity configuration of a wireless networking device and/or user device-initiated connectivity configuration in accordance with one or more embodiments.

Electronic device 1000 includes communication transceivers 1002 that enable wired or wireless communication of device data 1004, such as received data and transmitted data. Example communication transceivers include Wireless Personal Area Network (WPAN) radios compliant with various IEEE 802.15 (Bluetooth™) standards, Wireless Local Area Network (WLAN) radios compliant with any of the various IEEE 802.11 (WiFi™) standards, Wireless Wide Area Network (WWAN) radios for cellular telephony (3GPP-compliant), wireless metropolitan area network radios compliant with various IEEE 802.16 (WiMAX™) standards, and wired Local Area Network (LAN) Ethernet transceivers.

Communication transceivers 1002 couple to antennas 1006 to enable the transmission and reception of wireless signals. Antennas 1006 can be configured differently from one another, or work in concert to generate beam-formed wireless signals. For example, a first antenna of antennas 1006 can transmit/receive omnidirectional wireless signals, and subsequent antennas of antennas 1006 can work in concert to transmit/receive beam-formed wireless signals.

Electronic device 1000 may also include one or more data input ports 1008 via which any type of data, media content, and/or inputs can be received, such as user-selectable inputs to the device, messages, music, television content, recorded content, and any other type of audio, video, and/or image data received from any content and/or data source. The data input ports may include Universal Serial Bus (USB ports), coaxial cable ports, and other serial or parallel connectors (including internal connectors) for flash memory, Digital Versatile Discs (DVDs), Compact Discs (CDs), and the like. These data input ports may be used to couple the device to any type of components, peripherals, or accessories such as microphones, cameras, and/or modular attachments.

Electronic device 1000 includes a processor system 1010 of one or more processors (e.g., any of microprocessors, controllers, and the like) and/or a processor and memory system implemented as a system-on-chip (SoC) that processes computer-executable instructions. The processor system may be implemented at least partially in hardware, which can include components of an integrated circuit or on-chip system, an application-specific integrated circuit (ASIC), a field-programmable gate array (FPGA), a complex programmable logic device (CPLD), and other implementations in silicon and/or other hardware. Alternatively, or in addition, the device can be implemented with any one or combination of software, hardware, firmware, or fixed logic circuitry that is implemented in connection with processing and control circuits, which are generally identified as processing and control 1012. Electronic device 1000 may further include any type of a system bus or other data and command transfer system that couples the various components within the device. A system bus can include any one or combination of different bus structures and architectures, as well as control and data lines.

Electronic device 1000 also includes computer-readable storage memory or memory devices 1014 that enable data storage, such as data storage devices that can be accessed by a computing device, and that provide persistent storage of data and executable instructions (e.g., software applications, programs, functions, and the like). Examples of the computer-readable storage memory or memory devices 1014 include volatile memory and non-volatile memory, fixed and removable media devices, and any suitable memory device or electronic data storage that maintains data for computing device access. The computer-readable storage memory can include various implementations of random access memory (RAM), read-only memory (ROM), flash memory, and other types of storage media in various memory device configurations. Electronic device 1000 may also include a mass storage media device.

The computer-readable storage memory provides data storage mechanisms to store the device data 1004, other types of information and/or data, and various device applications 1016 (e.g., software applications, hardware drivers). For example, an operating system 1018 can be maintained as software instructions with a memory device and executed by the processor system 1010. The device applications may also include a device manager, such as any form of a control application, software application, signal-processing and control module, code that is native to a particular device, a hardware abstraction layer for a particular device, and so on. Memory devices 1014 also includes tracking module 1020, beacon management module 1022, and location database 1024.

Tracking module 1020 collects and stores spatial information associated with user devices. In some embodiments, tracking module 1020 collects the spatial information using the various protocols, measurements, and/or metrics provided by IEEE 802.11. Alternately or additionally, tracking module 1020 can initiate the transmission of, and/or collect information generated by, sounding frames. Upon collecting the spatial information, some embodiments of tracking module 1020 store the information in location database 1024.

Beacon management module 1022 determines a signal type to transmit beacon frames on (e.g., an omnidirectional wireless signal or a beam-formed wireless signal) and/or a direction in which to transmit the beacon frames. For instance, during an initial boot up, beacon management module 1022 can determine to transmit beacon frames using an omnidirectional wireless signal, or to transmit beacon frames using an initial beam-formed wireless signal with a direction identified through a default value and/or user-defined value. In some embodiments, beacon management module 1022 extracts spatial location information from location database 1024, and/or analyzes the information to determine a direction to transmit beacon frames in using a beam-formed wireless signal. Some embodiments of beacon management module 1022 interface with communication transceivers 1002 (such as through a software driver) to configure antennas 1006 as further described herein.

Location database 1024 stores location information corresponding to the spatial locations of various user devices, user-defined transmission direction and/or location information, and/or default location information. In some embodiments, location database 1024 stores user device information that is used to associate location information with a particular user device.

CONCLUSION

Various embodiments transmit beacon frames using beamforming techniques. During a beam-formed wireless connection with a user device, a wireless networking device obtains spatial location information associated with the user device. In turn, the wireless networking device stores the spatial information in a location database to track historical location data associated with successful connections to user devices. Some embodiments of the wireless networking device then use the historical location data to determine a direction in which to transmit beacon frames via a beam-formed wireless signal. Alternately or additionally, the wireless networking devices determines the direction used a pre-programmed location value. Responsive to determining the direction, the wireless networking device transmits the beacon frames using a beam-formed wireless signal in the determined direction effective to enable user devices to connect to the wireless networking device.

Although various aspects of transmitting beacon frames via beamforming techniques have been described in language specific to features and/or methods, the subject of the appended claims is not necessarily limited to the specific features or methods described. Rather, the specific features and methods are disclosed as example implementations, and other equivalent features and methods are intended to be within the scope of the appended claims. Further, various different embodiments are described and it is to be appreciated that each described embodiment can be implemented independently or in connection with one or more other described embodiments.

We claim:

1. A wireless networking device comprising:
one or more antennas for transmitting beam-formed wireless signals;
one or more processors; and
computer-readable storage devices comprising processor-executable instructions which, responsive to execution by the one or more processors, enable the wireless networking device to perform operations comprising:
establishing a successful data transmission with a user device using a first beam-formed wireless signal that is transmitted via a first subset of antenna of the one or more antennas;
learning one or more transmission parameters based, at least in part, on data transmissions associated with said connecting to the user device using the first beam-formed wireless signal by at least analyzing historical location data associated with successful data transmissions via beamforming techniques to one or more user devices to determine the one or more transmission parameters;
generating a second beam-formed wireless signal based, at least in part, on using the one or more transmission parameters to configure a second subset of antenna of the one or more antenna; and
transmitting one or more beacon frames on the second beam-formed wireless signal to advertise a presence of the wireless networking device.

2. The wireless networking device as recited in claim 1, wherein said analyzing further comprises:
analyzing the historical location data to identify a direction that has a higher probability of successful data transmissions via the beamforming techniques to the one or more user devices relative to other locations; and
determining the one or more transmission parameters based upon the direction.

3. The wireless networking device as recited in claim 1, wherein said analyzing further comprises generating a probability map that maps user device locations to a probability value associated with successful data transmissions via beamforming techniques to user devices.

4. The wireless networking device as recited in claim 3, wherein said transmitting the one or more beacon frames further comprises:
identifying, from the probability map, a location associated with a low probability of successful data transmissions via beamforming techniques to the user devices relative to other locations; and
transmitting beacon frames with null values to the location associated with the low probability.

5. The wireless networking device as recited in claim 1, said operations further comprising:
collecting spatial location information associated with the user device based, at least in part, on the first beam-formed wireless signal; and
storing the spatial location information in a location database.

6. The wireless networking device as recited in claim 5, wherein collecting the spatial location information further comprises:
transmitting, using the wireless networking device, sounding frames to the user device; and
receiving, from the user device, a matrix of angles of arrival associated with the user device receiving the sounding frames.

7. The wireless networking device as recited in claim 1, wherein said learning the one or more transmission parameters further comprises:
identifying a location associated with an unauthorized user device; and
determining the one or more transmission parameters by excluding the location associated with the unauthorized user device.

8. The wireless networking device as recited in claim 1, wherein said identifying the one or more transmission parameters further comprises using a user-defined location.

9. A computer-implemented method comprising:
- establishing, using an access point, successful data transmissions with a user device using a first beam-formed wireless signal;
- determining spatial location information associated with the user device based, at least in part, on the successful data transmissions with the user device using the first beam-formed wireless signal;
- storing the spatial location information in a location database to generate historical location data;
- generating, using the historical location data, a probability map that maps each location of one or more locations associated with user devices to a respective probability value that indicates a respective probability of a successful data transmission via beamforming to the user devices;
- determining a transmission direction for transmitting beacon frames by at least analyzing the probability map; and
- transmitting the beacon frames in the transmission direction using a second beam-formed wireless signal to advertise a presence of the access point in a predefined coverage area.

10. The computer-implemented method of claim 9, wherein said determining the transmission direction further comprises using the probability map to identify a range of transmission angles with a higher probability of successful data transmissions via beamforming techniques to the user devices relative to other transmission angles, and
- wherein said transmitting the beacon frames further comprises transmitting the second beam-formed wireless signal over the range of transmission angles.

11. The computer-implemented method of claim 9, wherein said determining the spatial location information further comprises using one or more metrics defined by the Institute of Electrical and Electronics Engineers (IEEE) 802.11 standards to determine the spatial location information.

12. The computer-implemented method of claim 9, wherein said determining the transmission direction for transmitting the beacon frames further comprises analyzing the historical location data to identify spatial location data associated with a second user device.

13. The computer-implemented method of claim 9, wherein said establishing the successful data transmission to the user device using the first beam-formed wireless signal further comprises:
- transmitting an initial set of beacon frames over an initial beam-formed wireless signal using a user-defined direction to transmit the initial beam-formed wireless signal.

14. The computer-implemented method of claim 9 further comprising:
- dynamically learning a new location associated with a successful data transmission via beamforming techniques to a new user device; and
- transmitting a new set of beacon frames to the new location by dynamically reforming the second beam-formed wireless signal to focus energy to the new location based on said learning the new location.

15. An access point comprising:
- one or more antennas;
- one or more processors; and
- computer-readable storage devices comprising processor-executable instructions which, responsive to execution by the one or more processors, enable the access point to perform operations comprising:
  - transmitting a first set of beacon frames using an omnidirectional wireless signal;
  - establishing successful data transmissions to a user device via a first beam-formed wireless signal based, at least in part, on said transmitting the first set of beacon frames;
  - determining based, at least in part on the successful data transmissions via the first beam-formed wireless signal, spatial location information associated with the user device to generate historical location data;
  - determining a transmission direction based, at least in part, on using the historical location data to identify transmission parameters; and
  - transmitting a second set of beacon frames that are focused in the determined transmission direction by using a second beam-formed wireless signal.

16. The access point as recited in claim 15, wherein said determining the transmission direction further comprises:
- identifying a range of transmission angles using the historical location data.

17. The access point as recited in claim 16, wherein the range of transmission angles is associated with generating a triangular-shaped transmission pattern.

18. The access point as recited in claim 15, said operations further comprising:
- generating, using the historical location data, a probability map that maps one or more locations associated with user devices to a respective probability value that indicates a respective probability of a successful data transmission via beamforming to the user devices.

19. The access point as recited in claim 18, said operations further comprising:
- identifying, from the probability map, a location associated with a low probability of successful data transmissions via beamforming techniques to the user devices relative to other locations; and
- transmitting beacon frames with null values to the location associated with the low probability.

20. The access point as recited in claim 15, wherein said determining the spatial location information comprises obtaining at least some location information from the user device during an association process.

* * * * *